(12) United States Patent
Metral

(10) Patent No.: US 11,049,090 B2
(45) Date of Patent: Jun. 29, 2021

(54) NFC APPLICATION REGISTRY FOR ENHANCED MOBILE TRANSACTIONS AND PAYMENTS

(71) Applicant: PAYPAL, INC., San Jose, CA (US)

(72) Inventor: Max Edward Metral, Brookline, MA (US)

(73) Assignee: PAYPAL, INC., San Jose, CA (US)

( * ) Notice: Subject to any disclaimer, the term of this patent is extended or adjusted under 35 U.S.C. 154(b) by 661 days.

(21) Appl. No.: 14/984,968

(22) Filed: Dec. 30, 2015

(65) Prior Publication Data

US 2016/0267459 A1 Sep. 15, 2016

Related U.S. Application Data

(60) Provisional application No. 62/131,462, filed on Mar. 11, 2015.

(51) Int. Cl.
*G06Q 20/32* (2012.01)
*G06Q 20/40* (2012.01)
(Continued)

(52) U.S. Cl.
CPC ........... *G06Q 20/322* (2013.01); *G06Q 20/02* (2013.01); *G06Q 20/3224* (2013.01);
(Continued)

(58) Field of Classification Search
None
See application file for complete search history.

(56) References Cited

U.S. PATENT DOCUMENTS

| 7,418,596 | B1 * | 8/2008 | Carroll | H04W 12/03 |
| | | | | 713/169 |
| 8,229,852 | B2 * | 7/2012 | Carlson | G06Q 20/04 |
| | | | | 705/39 |

(Continued)

FOREIGN PATENT DOCUMENTS

| EP | 2652694 A4 * | 7/2014 | ........... G06Q 20/384 |
| JP | 5791128 B2 * | 10/2015 | ......... G06Q 20/3255 |

OTHER PUBLICATIONS

Abdalghader pauraJi. The Presentation of an Ideal Safe SMS based model in mobile Electronic commerce using Encryption hybrid algorithms AES and ECC. Apr. 2014. https://ieeexplore.ieee.org/stamp/stamp.jsp?tp=&arnumber=6836761 (Year: 2014).*

(Continued)

*Primary Examiner* — El Mehdi Oussir
(74) *Attorney, Agent, or Firm* — Haynes and Boone, LLP

(57) ABSTRACT

Methods, systems, and computer program products for providing enhanced mobile transactions and payments are disclosed. A computer-implemented method may include providing a registry of public keys to allow users to securely exchange mobile payment data with respective trusted merchants, sending a request from a computing device of a user to validate a merchant, storing a public key for the merchant from the registry, receiving a merchant identifier from a terminal during a mobile transaction indicating that the terminal is associated with the merchant, receiving a request for information from the terminal as part of the mobile transaction, determining whether the terminal requesting the information is trusted, providing the requested information encrypted using the public key to the terminal when the terminal is trusted, and providing decoy response information to the terminal when the terminal is determined to be untrusted.

20 Claims, 6 Drawing Sheets

(51) Int. Cl.
*G06Q 20/38* (2012.01)
*G06Q 20/02* (2012.01)
*G06Q 30/00* (2012.01)

(52) U.S. Cl.
CPC ..... *G06Q 20/3278* (2013.01); *G06Q 20/3829* (2013.01); *G06Q 20/4014* (2013.01); *G06Q 30/01* (2013.01); *G06Q 2220/00* (2013.01)

(56) References Cited

U.S. PATENT DOCUMENTS

| | | | | |
|---|---|---|---|---|
| 9,135,612 | B1* | 9/2015 | Proctor, Jr. | G06Q 20/3278 |
| 9,715,689 | B1* | 7/2017 | Ellis | G06Q 20/322 |
| 10,504,179 | B1* | 12/2019 | McGuire | G06Q 40/04 |
| 2004/0199475 | A1* | 10/2004 | Rivest | G06Q 20/02 |
| | | | | 705/67 |
| 2005/0204128 | A1* | 9/2005 | Aday | H04L 9/0825 |
| | | | | 713/152 |
| 2008/0103972 | A1* | 5/2008 | Lanc | G06Q 20/32 |
| | | | | 705/44 |
| 2009/0327825 | A1* | 12/2009 | Natsuno | H04L 63/0823 |
| | | | | 714/748 |
| 2011/0137797 | A1* | 6/2011 | Stals | G06Q 20/02 |
| | | | | 705/44 |
| 2011/0276496 | A1* | 11/2011 | Neville | G06Q 20/04 |
| | | | | 705/75 |
| 2012/0016731 | A1* | 1/2012 | Smith | G06Q 20/20 |
| | | | | 705/14.33 |
| 2012/0203701 | A1* | 8/2012 | Ayuso de Paul | H04L 65/1069 |
| | | | | 705/71 |
| 2013/0191232 | A1 | 7/2013 | Calman et al. | |
| 2013/0275222 | A1* | 10/2013 | Amaro | G06Q 50/01 |
| | | | | 705/14.58 |
| 2014/0025958 | A1 | 1/2014 | Calman | |
| 2014/0040145 | A1* | 2/2014 | Ozvat | G06Q 20/027 |
| | | | | 705/64 |
| 2014/0040146 | A1* | 2/2014 | Fiske | G06Q 20/3229 |
| | | | | 705/67 |
| 2014/0040147 | A1* | 2/2014 | Varadarajan | G06Q 20/3823 |
| | | | | 705/71 |
| 2014/0074637 | A1 | 3/2014 | Hammad | |
| 2014/0108260 | A1 | 4/2014 | Poole et al. | |
| 2014/0249945 | A1* | 9/2014 | Gauthier | G06Q 20/24 |
| | | | | 705/17 |
| 2015/0019443 | A1* | 1/2015 | Sheets | G06Q 20/3278 |
| | | | | 705/71 |
| 2015/0032627 | A1 | 1/2015 | Dill et al. | |
| 2015/0046338 | A1 | 2/2015 | Laxminarayanan et al. | |
| 2015/0058145 | A1 | 2/2015 | Luciani | |
| 2015/0081462 | A1* | 3/2015 | Ozvat | G06Q 20/40 |
| | | | | 705/21 |
| 2015/0088756 | A1* | 3/2015 | Makhotin | G06Q 20/3829 |
| | | | | 705/71 |
| 2015/0127529 | A1 | 5/2015 | Makhotin et al. | |
| 2016/0005009 | A1* | 1/2016 | Li | G06Q 20/327 |
| | | | | 705/71 |
| 2016/0132873 | A1 | 5/2016 | Elbaum et al. | |
| 2016/0189157 | A1* | 6/2016 | Bavirisetty | G06Q 20/401 |
| | | | | 705/44 |
| 2016/0364723 | A1* | 12/2016 | Reese | G06Q 20/38215 |
| 2017/0148018 | A1* | 5/2017 | Levin | H04W 12/04 |

OTHER PUBLICATIONS

International Searching Authority, International Search Report and Written Opinion for PCT/US2015/063452, dated Feb. 1, 2016, 9 pages.

International Search Report and Written Opinion issued by the U.S. International Searching Authority for PCT/US2016/031325 dated Aug. 5, 2016; 8 pp.

* cited by examiner

NFC APPLICATION REGISTRY FOR ENHANCED MOBILE TRANSACTIONS AND PAYMENTS

CROSS-REFERENCE TO RELATED APPLICATION

The present application claims priority to U.S. Provisional Application Ser. No. 62/131,462, filed Mar. 11, 2015, entitled "Enhanced Mobile Transaction and Payments," the disclosure of which is incorporated herein by reference in its entirety.

TECHNICAL FIELD

The present disclosure generally relates to computer systems and, more particularly, to providing enhanced communications and features for mobile transactions and payments using computer systems.

BACKGROUND

A growing number of consumers use mobile computing devices to perform mobile payments and other types of contactless transactions. For example, a consumer with a smart phone or wearable smart device may communicate payment information and other data wirelessly to a near field communication (NFC) terminal reader to make a payment or to perform another mobile transaction.

Today, mobile transactions are usually limited to basic interaction between a smart device and a contactless terminal. As a result, existing mobile transactions and payments generally do not offer enhanced convenience, security, and experiences that would benefit merchants, consumers, and payment service providers. Therefore, new and improved ways of providing enhanced mobile transactions and payments are of importance.

BRIEF DESCRIPTION OF THE DRAWINGS

Various examples of the present disclosure will be understood more fully from the detailed description given below and from the accompanying drawings of various examples of the disclosure. In the drawings, like reference numbers may indicate identical or functionally similar elements. The drawing in which an element first appears is generally indicated by the left-most digit in the corresponding reference number.

DETAILED DESCRIPTION

Figure 1:
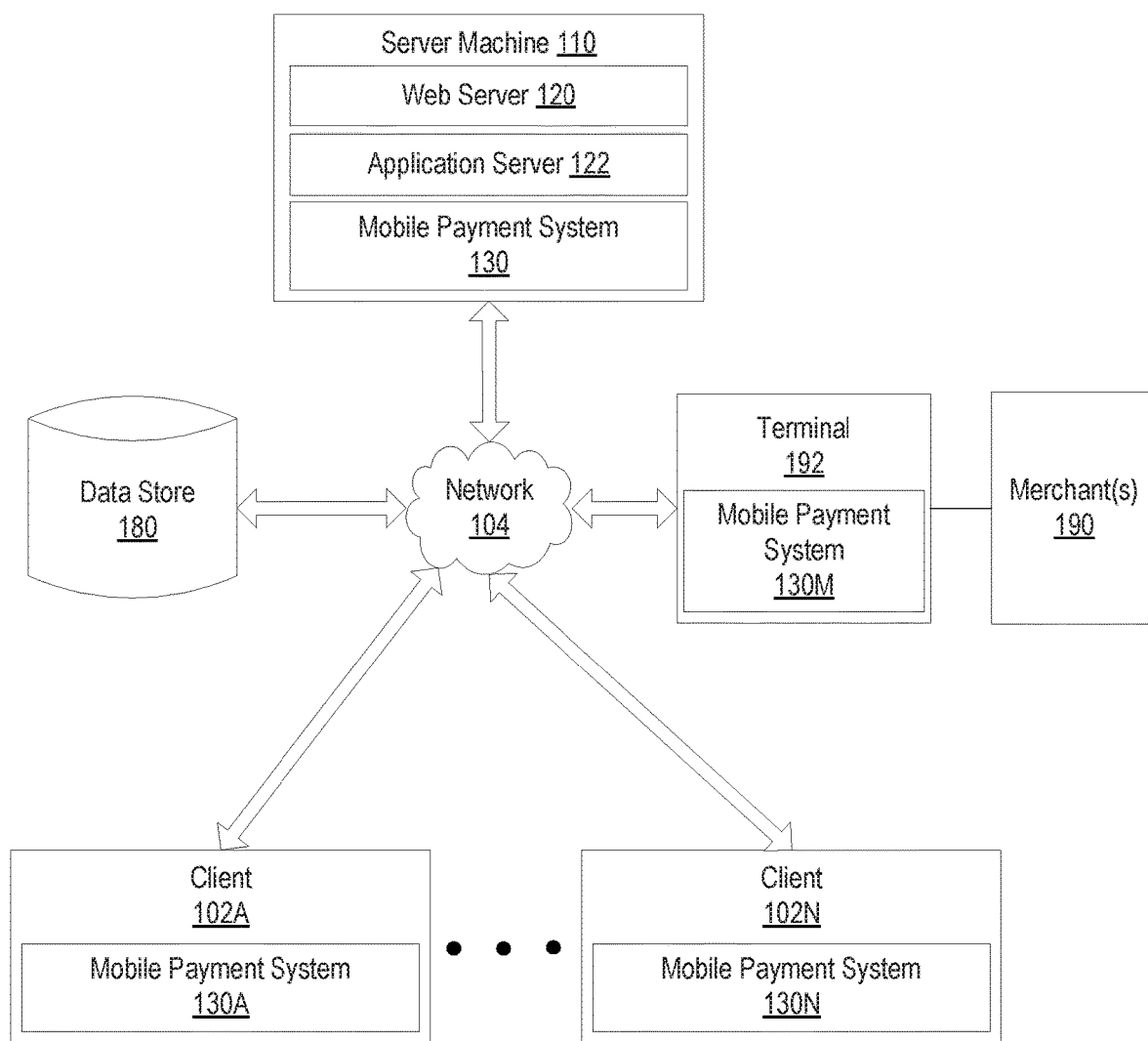
FIG. 1 is a block diagram illustrating a system architecture, in accordance with various examples of the present disclosure.

Systems, methods, and computer program products are disclosed for providing enhanced mobile transactions and payments. In an example, a near field communication terminal may receive configuration information that allows a mobile payment system to request that a computing device use an application for a mobile transaction. The mobile payment system then may request that a computing device use the application for the mobile transaction, receive a response indicating whether the requested application is available to the computing device, and automatically process the mobile transaction using the requested application when the application is available to the computing device. The mobile payment system also may process the mobile transaction using standard processing without use of the requested application when the application is unavailable to the computing device or when a user wishes to use standard processing.

In an example, a mobile payment system may receive a request to provide an enhanced merchant experience available from a merchant to one or more consumers participating in mobile transactions with the merchant, determine whether to provide the enhanced merchant experience to a user involved in the mobile transaction with the merchant, determine when to provide the enhanced merchant experience to the user involved in the mobile transaction with the merchant, and provide the enhanced merchant experience to the user involved in the mobile transaction with the merchant as part of the transaction, as part of completing the transaction, or after completing the transaction.

In an example, a mobile payment system may initiate a mobile transaction with a computing device of a user, determine to generate a rendezvous request for the mobile transaction, generate the rendezvous request for the mobile transaction, provide the rendezvous request to the computing device of the user involved in the mobile transaction, provide information about the rendezvous request to a second computing device that is to receive a response to the rendezvous request from the user, query the second computing device to determine whether a response to the rendezvous request is available, receive the response to the rendezvous request from the second computing device, and resume processing of the mobile transaction after receiving the response to the rendezvous request from the second computing device.

In an example, an enhanced mobile transaction also may include providing a registry of public keys to allow users to securely exchange mobile payment data with merchants, receiving a public key from a merchant, providing the public key from the merchant to a computing device of a user, sending private user data from a merchant terminal to the computing device of the user, receiving a request from the computing device of the user to validate the merchant, storing the public key for the merchant from the registry by the computing device of the user, receiving a merchant identifier from a NFC terminal by the computing device of the user during a mobile transaction indicating that the NFC terminal is associated with the merchant, receiving a request for information from the NFC terminal by the computing device of the user as part of the mobile transaction, determining by the computing device of the user whether the NFC terminal requesting the information is trusted, providing by the computing device of the user the requested information encrypted using the public key to the NFC terminal when the merchant is trusted, and providing decoy response information to the NFC terminal when the merchant identifier provided by the NFC terminal is determined to be untrusted.

Accordingly, aspects of the present disclosure provide merchants, users, payment providers, and various other parties with enhanced mobile transaction and payment services that, among other things, offer added efficiency, convenience, and security. As such, the numerous features described in the examples of the present disclosure may be provided individually or combined together in various arrangements to provide enhanced mobile transactions and payments.

FIG. 1 illustrates an exemplary system architecture 100 in which examples of the present disclosure may be implemented. System architecture 100 includes one or more server machines 110, one or more data stores 180, one or more client machines 102A-102N, one or more merchants 190, and one or more terminals 192 connected via one or more networks 104.

Network 104 may be a public network (e.g., the Internet), a private network (e.g., local area network (LAN) or wide area network (WAN)), or any combination thereof. In an example, network 104 may include the Internet, one or more intranets, wired networks, wireless networks, and/or other appropriate types of communication networks. In one example, network 104 may comprise a wireless telecommunications network (e.g., cellular phone network) adapted to communicate with other communication networks, such as the Internet. Network 104 also may include one or more short-range wireless networks or beacon networks.

Data store 180 generally refers to persistent storage capable of storing various types of data, such as text, audio, video, and image content. In some examples, data store 180 may include a network-attached file server, while in other examples data store 180 may include other forms of persistent storage such as an object-oriented database, a relational database, and so forth.

Client machine 102A may be a personal computer (PC), laptop, mobile phone, tablet computer, server computer, wearable computing device, or any other type of computing device. Client machine 102A may run an operating system (OS) that manages hardware and software of the client machine 102A. A browser (not shown) may run on the client machines (e.g., on the OS of the client machines). The browser may be a web browser that can access content and services provided by web server 120, application server 122, or a combination of web server 120 and an application server 122. Other types of computer programs and computer scripts also may run on client machine 102A.

Client machines 102A-102N each may include a respective mobile payment system 130A-130N that allows a user to participate in mobile transactions, including mobile payments and other types of contactless transactions. In general, mobile payment system 130A allows a user to perform a contactless payment or other type of mobile transaction by sending a payment token and/or other data to a near field communication (NFC) terminal 192 or other type of contactless terminals 192 from client machine 102A. Generally, a user may perform a contactless payment to pay for a purchase of goods or services, to make a donation, to make a deposit, to transfer funds, or to complete various other financial and non-financial transactions. Further, various mobile transactions may occur, for example, using NFC-enabled vending machines, NFC-enabled kiosks, NFC-enabled point-of-sale systems, and other various types of NFC-enabled computer systems.

Merchants 190 generally refer to one or more parties that sell or otherwise provide products or services to various parties such as consumers, businesses, governments, non-profit organizations, etc. Merchants 190 generally may provide goods or services by having a physical presence, by operating online with a virtual presence, and/or with the assistance of one or more intermediate agents (e.g., brokers, handlers, shippers, etc.).

In an example, merchants 190 may accept and process payments for goods and services using one or more types of systems such as near field communication (NFC) terminals 192, tokenized payment systems, standard terminals, etc. A NFC terminal 192 generally describes a contactless computer system that allows a user to perform mobile transactions or payments by using short-range, wireless, and/or radio frequency identification (RFID) technology to exchange small amounts of data with an in-range computing device of the user. For example, a user may communicate payment information to a NFC terminal 192 wirelessly by tapping or holding a computing device (e.g., a smartphone, a wearable computing device, etc.) near a NFC terminal 192 to pay for a purchase, to check in at a location, to provide information prior to or during an appointment, to schedule an appointment, to sign up for a newsletter, to register for a loyalty program, etc.

In an example, a user may add one or more sources or methods of payment (e.g., a credit card, debit card, a bank account, etc.) to a payment application running on a computing device (e.g., smart phone, smart watch, etc.). However, instead of storing actual card or account identifiers on the computing device, a unique device account number may be generated, encrypted, and securely stored in a secured element of the computing device. Next, a unique, single-use payment token to authorize a payment may be generated by the computing device, the payment application, a third-party such as a payment processor, or another party for each payment transaction in which the user participates.

In an example, a user may provide a unique, single-use payment token generated for specific payment transaction to a NFC terminal 192 via a NFC-enabled computing device to pay for a purchase. The merchant then may use the unique, single-use payment token alone or along with other payment information (e.g., a secure device-specific identifier, a secure surrogate account identifier, etc.) provided by the user's computing device to obtain payment from a payment processor, bank, or other financial institution. The use of a unique, single-use payment token in tokenized payment transactions is generally more secure than a reusable credit card or account number because the payment token is valid for a single transaction and cannot be reused by criminals to procure additional financial transactions.

Tokenization generally describes the process of substituting a sensitive data element with a non-sensitive equivalent (i.e., a token), which has no extrinsic or exploitable meaning or value. Such tokenized data may be mapped or translated back to the original data using secure methods. Thus, a single-use payment/transaction token may be mapped or translated to an actual payment/transactional account to apply a form of payment/transaction processing, but the single-use payment/transaction token generally has no meaning otherwise when used by itself.

Server machine 110 may include one or more web servers 120 and application servers 122. Web server 120 may provide text, audio, image, and video content from server machine 110 or other sources (e.g., data store 180) to client machines 102A-102N and terminal 192. Web server 120 also may provide web-based application services, business logic, and updates to client machines 102A-102N and terminal 192. Client machines 102A-102N and terminal 192 may locate, access, and consume various forms of content and services from web server 120 using applications, such as a web browser, web servers, and various other types of computer applications, etc. Web server 120 also may receive text, audio, video, and image content from client machines 102A-102N and terminal 192, which may be stored in data store 180 for preservation and/or sharing of content.

In an example, web server 120 is coupled to one or more application servers 122 that provide application services, data, business logic, and/or APIs to client machines 102A-102N and terminal 192. In some examples, application servers 122 also may provide such services to client machines 102A-102N without use of web server 120.

In an example, web server 120 may provide client machines 102A-102N and terminal 192 with access to one or more application server 122 services associated with a mobile payment system 130. Such functionality also may be provided as part of one or more different web applications, standalone applications, systems, plug-ins, web browser extensions, and application programming interfaces (APIs), etc. In some examples, plug-ins and extensions generally may be referred to, individually or collectively, as "add-ons."

In an example, client machines 102A-102N and terminal 192 may include an application associated with a service provided by server machine 110 (e.g., mobile payment system 130). For example, various types of computing devices (e.g., smart phones, smart televisions, tablet computers, smart wearable devices, smart home computer systems, etc.) may use applications to access services provided by server machine 110, to issue commands to server machine 110, and/or to receive content from server machine 110 without visiting or using web pages.

In an example, functions performed by server machine 110 also may be performed by client machines 102A-102N and terminal 192, in whole or in part. In addition, the functionality attributed to a particular component may be performed by different or multiple components operating together. Further, server machine 110 may be accessed as a service provided by systems or devices via appropriate application programming interfaces (APIs), and thus is not limited to use with websites.

For example, client machines 102A-102N and terminal 192 each may include respective mobile payment systems 130A, 130N, 130M and/or one or more client modules of a respective mobile payment system 130A, 130N, 130M for providing mobile payment and other contactless transactional services to a user. Further, server machine 110 may include a respective mobile payment system 130 and/or one or more server-based modules of a mobile payment system 130.

In an example, mobile payment systems 130-130M perform non-standard processing of mobile transactions and mobile payments. For example, mobile payment systems 130-130M may be configured to request use of a particular identified application to complete a mobile transaction or payment. In such examples, mobile payment systems 130-130M may request whether a mobile device has access to an application based on a unique attribute of the application (e.g., application ID, application name, etc.). Mobile payment systems 130-130M then may automatically process a mobile transaction or payment when the mobile device has access to the payment, or perform standard processing when the mobile device is unable to access the application.

In an example, mobile payment systems 130-130M provide enhanced merchant experiences to users involved in a mobile transaction or payment. For example, mobile payment systems 130-130M may receive a request from merchant 190 to provide an enhanced merchant experience available from merchant 190 to one or more consumers participating in mobile transactions with the merchant 190. Mobile payment systems 130-130M then may determine whether to and/or when to provide the enhanced merchant experience to a user involved in a mobile transaction with the merchant 190. Further, mobile payment systems 130-130M then may provide the enhanced merchant experience to the user involved in the mobile transaction as part of the transaction, at completion of the transaction, or after completing the transaction.

In an example, mobile payment systems 130-130M provide rendezvous request services for mobile transactions and payments. For example, mobile payment systems 130-130M may initiate a mobile transaction with a computing device of a user, determine to generate a rendezvous request for the mobile transaction, generate the rendezvous request for the mobile transaction, provide the rendezvous request to the computing device of the user involved in the mobile transaction, provide information about the rendezvous request to a second computing device (e.g., of a payment processor, transaction broker, merchant server, third-party server, or other party) that is to receive a response to the rendezvous request from the user, query the second computing device to determine whether a response to the rendezvous request was received from the user, receive the response to the rendezvous request provided by the user from the second computing device, and resume processing of the mobile transaction after receiving the response to the rendezvous request.

A rendezvous request generally describes a special type of request for allowing users to complete long-running, time extended, multi-step, and/or multi-location activities based on a single interaction with a near field communication (NFC) terminal 192 or other type of computing device. For example, a user may initiate a mobile transaction by carrying, tapping, waving, or presenting a mobile device near or at terminal 192. The transaction may be generated as or converted by a merchant or user to a rendezvous request that allows a user to complete one or more aspects of the transaction without usual operational constraints enforced by terminal 192 or an associated transactional protocol.

A rendezvous request may allow a user to complete one or more aspects of the transaction initiated at terminal 192 with the same computing device that initiate the transaction, or one or more other different computing devices. Further, a rendezvous request also may allow a user to complete one or more aspects of the transaction at one or more other locations (at a same or different time) and using one or more other communication channels (e.g., the Internet, a private or high-speed network, telephone, interactive television, at another payment terminal, by interacting with another computing device using a different communication protocol, etc.). As such, rendezvous requests allow merchants, vendors, payment providers, and other parties to integrate mobile payment terminals flexibly and creatively with other types of technologies and business processes to improve both operational efficiency and customer experiences.

In an example, mobile payment systems 130-130M also provide a mobile payment application registry to allow users to exchange mobile payment data securely with respective merchants 190. For example, mobile payment systems 130-130M may provide or use a registry of public keys that allow users to securely exchange mobile payment data with merchants, receive a public key from merchant 190 for secure mobile transactions, provide the public key from the merchant to a computing device of a user as part of a mobile transaction, send private user data from a merchant terminal 192 to the computing device of the user, receive a request from the computing device of the user to validate the merchant's 190 identity or reputation, store the public key for the merchant 190 from the registry, receive a merchant identifier from a NFC terminal by the computing device of the user during a mobile transaction, receive a request for information from the NFC terminal by the computing device of the user as part of the mobile transaction, determining whether the NFC terminal requesting the information is trusted, provide the requested information encrypted using the public key to the NFC terminal when the NFC terminal is trusted, and provide decoy response information to the NFC terminal when the NFC terminal is untrusted.

Figure 2:
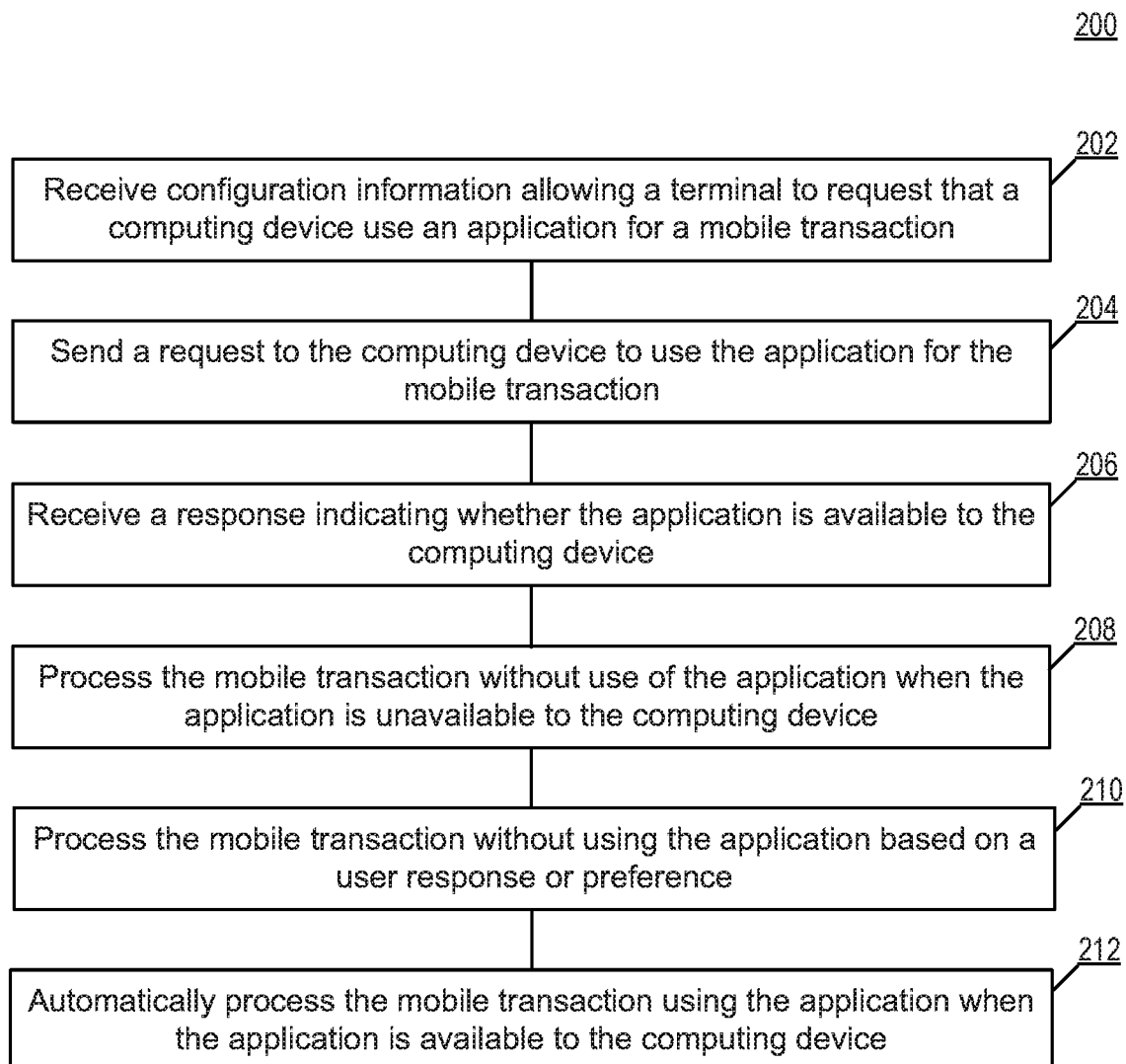
FIG. 2 is a flow diagram for providing enhanced mobile transactions, according to an example of the present disclosure.

FIG. 2 is a flow diagram for providing enhanced mobile transactions, according to an example of the present disclosure. The method 200 may be performed by processing logic that may comprise hardware (circuitry, dedicated logic, programmable logic, microcode, etc.), software (such as instructions run on a general purpose computer system, dedicated machine, or processing device), firmware, or a combination thereof. Examples in the method 200 are described with respect to mobile payment system 130M for consistency, and also generally apply to other examples of mobile payment systems 130, 130A, 130N described herein.

Method 200 begins at block 202 when mobile payment system 130M receives configuration information allowing terminal 192 to request that a computing device use a specifically named or identified software application to complete a mobile transaction. In an example, the mobile payment system 130M associated with terminal 192 of merchant 190 is configured to process mobile transactions such as mobile payments using one or more standard processes. For example, mobile payment system 130M may process mobile payments using standard digital wallet rules, default payment methods, default payment providers, default mobile applications, and other standard ways of processing mobile payments. In one example, standard payment processing may occur by default based on payment processing associated with a particular brand or type of client machine 102A, a default digital wallet chosen or available on client machine 102A, or a default payment method chosen for a digital wallet available on client machine 102A.

In some examples, standard payment processing performed by mobile payment system 130M is inflexible and does not allow a user to choose or utilize other types of payment options that may be available at terminal 192. For example, client machine 102A may be limited to a particular mobile payment processing method based on a hardware manufacturer of the client machine 102A or a digital wallet installed on the client machine 102A. Thus, client machine 102A is generally unable to utilize non-standard types of mobile payment processing that may be available at various terminals 192.

In an example, mobile payment system 130M is configured to perform one or more non-standard types of mobile payment processing. For example, mobile payment system 130 may be configured to first attempt to perform one or more types of non-standard mobile payment processing prior to attempting to perform one or more standard or default types of payment processing. In one example, mobile payment system 130M of terminal 192 is initially configured by a manufacturer, merchant 190, or other party to perform one or more types of non-standard mobile payment processing. For example, the mobile payment system 130M of terminal 192 may be updated or reconfigured by a manufacturer, merchant 190, or other party (e.g., a payment service provider, financial institution, etc.) after an initial or earlier configuration to perform one or more types of non-standard mobile payment processing. Such payment processing may be non-standard because it deviates (circumvents, bypasses, etc.) from normal, accepted mobile payment processing standards, deviates from industry-accepted mobile payment processing standards, or allows a client machine 102A to perform mobile payment processing in one or more ways that normally would not be available.

At block 204, mobile payment system 130M sends a request to the computing device to use the application for the mobile transaction. In an example, mobile payment system 130M performs non-standard mobile payment processing by allowing a merchant 190 to prioritize a premier, trusted, or selected payment processing provider that is to provide payment processing on terminals 192 of merchant 190. For example, merchant 190 may choose a payment processing provider based on a partnership, contractual agreement, special rate, or for other various reasons.

In one example, mobile payment system 130M of merchant 190 terminal 192 first asks the client machine 102A involved in a mobile payment transaction whether the client machine 102A has access to a mobile payment application from a merchant-selected payment processing provider. For example, mobile payment system 130M may ask whether the client machine 102A has access to a specific mobile payment application from a payment provider based on a unique mobile application identifier (ID), name, etc.

At block 206, mobile payment system 130M receives a response indicating whether the requested application is available to the computing device. In an example, a response provided by client machine 102A indicates that the client machine 102A has access to the application requested for use by mobile payment system 130M. For example, client machine 102A may indicate that a mobile payment processing application is currently installed on the client machine 102A based on a mobile application identifier (ID) or other unique identifier provided by mobile payment system 130M. In other examples, the client machine 102A determines that it does not have access to a mobile payment application requested for use in a mobile transaction by mobile payment system 130M and provides other non-standard or standard processing accordingly.

At block 208, mobile payment system 130M processes the mobile transaction without use of the requested application when the application is unavailable to the computing device (e.g., not installed, not accessible, broken, not able to be used for one or more other reasons, etc.). In an example, mobile payment system 130M processes a pending mobile payment transaction without use of a requested application when it receives a response indicating that the application is unavailable to client machine 102A. Mobile payment system 130M also may proceed with standard processing when a response is not received from client machine 102A within a predetermined amount of time.

At block 210, mobile payment system 130M processes the mobile transaction without using the application based on a user response or preference. In some examples, mobile payment system 130M provides a user of client machine 102A with an option to use a requested application for a mobile payment transaction. For example, mobile payment system 130M may offer a user a promotion, a discount, or other incentive to use the requested application for a mobile payment transaction. In one example, mobile payment system 130M continues processing a pending mobile payment transaction using standard payment processing when a user indicates that they do not wish to use the requested application or they wish to use another form of mobile payment processing to complete a transaction. Also, mobile payment system 130 may continue processing the pending mobile payment transaction using standard payment processing when non-standard payment processing cannot be completed or fails for one or more reasons.

At block 212, mobile payment system 130M automatically processes the mobile transaction using the application when the application is available to the computing device. In an example, mobile payment system 130M receives an indication from client machine 102A that a mobile application requested for use in a mobile payment transaction is available to client machine 102A. In response, mobile payment system 130M automatically begins processing the mobile payment transaction using the requested application. In some examples, payment system 130 automatically triggers mobile payment processing using the requested application without seeking user input or considering standard payment processing options when the application requested for use in a mobile payment transaction is available to client machine 102A.

Figure 3:
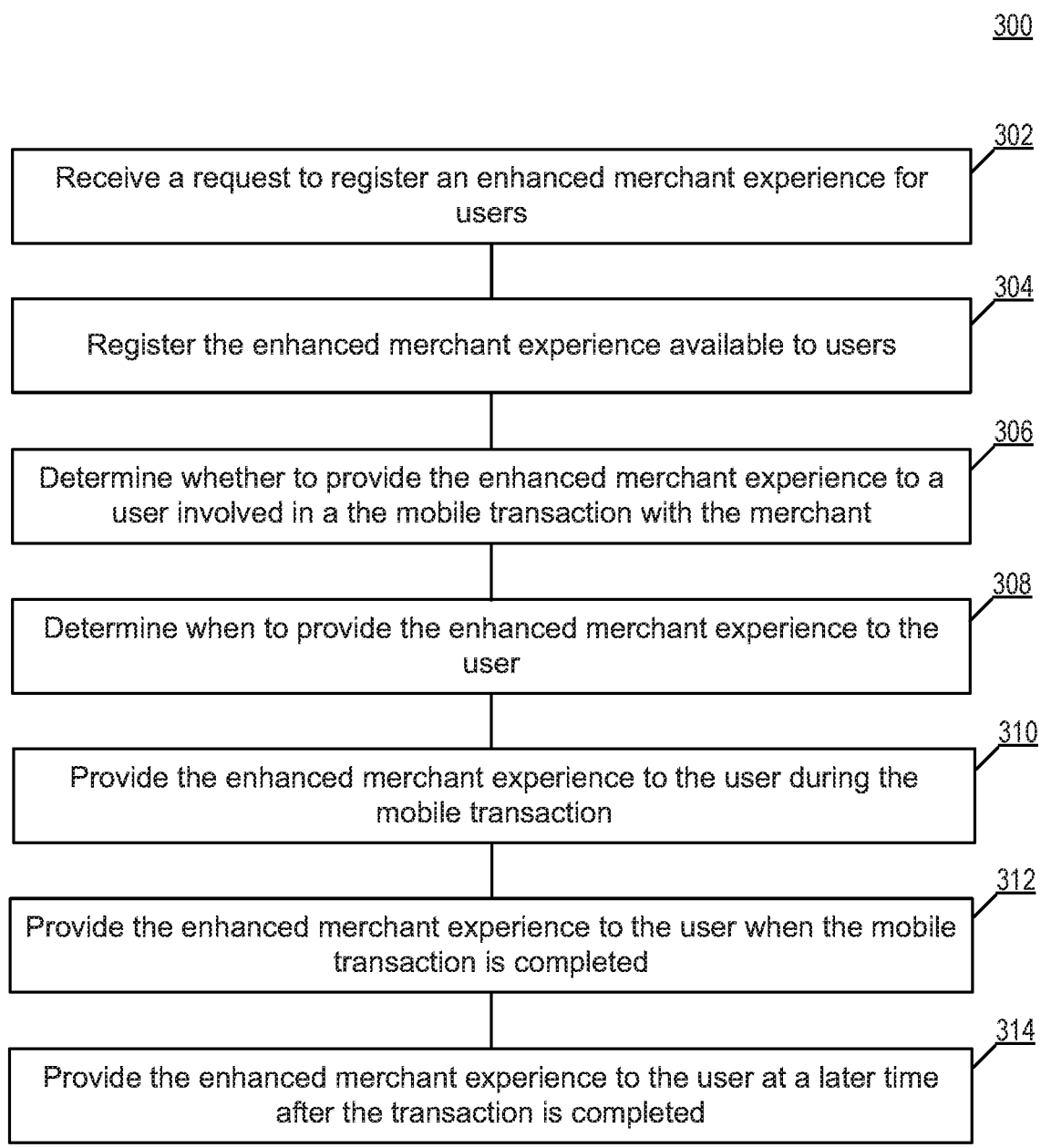
FIG. 3 is a flow diagram for providing NFC cookies for enhanced mobile transactions, according to an example of the present disclosure.

FIG. 3 is a flow diagram for providing NFC cookies for enhanced mobile transactions, according to an example of the present disclosure. The method 300 may be performed by processing logic that may comprise hardware (circuitry, dedicated logic, programmable logic, microcode, etc.), software (such as instructions run on a general purpose computer system, dedicated machine, or processing device), firmware, or a combination thereof. Examples in the method 300 are described with respect to mobile payment systems 130 and 130A for consistency, and also generally apply to other examples of mobile payment systems 130N, 130M described herein.

Method 300 begins at block 302 when mobile payment system 130 receives a request to register an enhanced merchant experience for users. In an example, mobile payment system 130 receives a request from merchant 190 to register an enhanced merchant experience available to one or more users involved in mobile payment transactions with the merchant 190. For example, merchant 190 may provide promotions, discounts, mobile applications, newsletters, magazines, price matching, loyalty programs, custom receipts, custom checkout experiences, and/or other types of enhanced merchant experiences for their customers. Merchant 190 may wish to promote or make such enhanced merchant experiences available to users participating in mobile payment transactions at near field communication (NFC) terminals 192. In one example, merchant 190 registers one or more enhanced merchant experiences available to users with a payment processing provider that assists the merchant 190 in providing various enhanced merchant experiences to users. For example, merchant 190 may register enhanced merchant experiences using a special website, using a separate application, via a standard or custom data load, etc.

At block 304, mobile payment system 130 registers the enhanced merchant experience available to users. In an example, mobile payment system 130 registers one or more enhanced merchant experiences available to customers of merchant 190 in a merchant 190 directory, payment processing service directory, or in one or more other directories for later reference and use. For example, mobile payment system 130 may register an enhanced merchant experience by recording data, attributes, criteria, and other information about the enhanced merchant experience to allow the selection, use, and delivery of the experience to one or more qualifying and/or accepting users. For example, such information may include, but is not limited to, a merchant experience name, a merchant experience description, a merchant experience flow, a merchant experience type, attributes of a matching user, attributes of a matching mobile payment transaction, timing attributes, delivery options, user preferences, associated applications, and/or one or more other criteria affecting selection, timing, and/or communication of an enhanced merchant experience to a user. In some examples, mobile payment system 130 registers enhanced merchant experiences on server machine 110. Mobile payment system 130 also may register enhanced merchant experiences on terminals 192 by communicating or updating various respective mobile payment systems 130M.

At block 306, mobile payment system 130A determines whether to provide the enhanced merchant experience to a user involved in a mobile transaction with the merchant 190. In an example, a user completes or attempts to complete a mobile transaction with merchant 190 using client machine 102A and terminal 192. For example, the user may use client machine 102A to check in at a location or complete a mobile payment transaction at a near field communication (NFC) terminal 192 of the merchant 190.

In an example, a NFC terminal 192 engaged in a mobile payment transaction with client machine 102A provides a merchant identifier (ID) to an application running on client machine 102A. For example, NFC terminal 192 may provide the merchant identifier to mobile payment system 130A running on client machine 102A or an associated mobile payment processing application running on the client machine 102A.

In an example, mobile payment system 130A or another application running on client machine 102A receives the merchant identifier from the NFC terminal 192 and then determines whether to provide one or more enhanced merchant experiences to the user. For example, a mobile payment system 130A may use a merchant identifier to find one or more enhanced merchant experiences available for the user from a directory of information. Mobile payment system 130A then may determine whether to provide one or more of the enhanced merchant experiences to the user based on user preferences, attributes of client machine 102A, applications available on client machine, transaction attributes, aspects of the user's history with the merchant 190, whether an application from merchant 190 is installed on client machine 102A, etc.

At block 308, mobile payment system 130A determines when to provide the enhanced merchant experience to the user. In an example, mobile payment system 130A determines an appropriate time to upsell or offer various promotions, advertisements, discounts, application features, or other enhanced merchant experiences to a user. Such experiences may be provided, for example, during or as part of a mobile transaction, at completion of the mobile transaction, or at some time after completion of the mobile transaction (seconds, minutes, hours, days, weeks, months, years, etc.).

In some examples, mobile payment system 130A determines when to provide one or more enhanced merchant experiences to a user based on user preferences, attributes of client machine 102A, applications available on client machine 102A, transactional attributes, aspects of the user's history with the merchant 190, whether an application of the merchant 190 is installed on client machine 102A, etc.

At block 310, mobile payment system 130 provides the enhanced merchant experience to the user during the mobile transaction. In an example, mobile payment system 130A provides an enhanced merchant experience as part of a mobile transaction by displaying information, such as messages or splash screens as the user completes the mobile transaction. Mobile payment system 130A also may perform a handoff to an available merchant 190 application running on client machine 102A to allow the user to complete the mobile transaction using the merchant's 190 application.

At block 312, mobile payment system 130 provides the enhanced merchant experience to the user when the mobile transaction is completed. In an example, mobile payment system 130A provides the enhanced merchant experience at completion of the mobile transaction, using a digital receipt, email receipt, email message, push notification, application message, splash screen, application redirection, webpage redirection, etc. In one example, mobile payment system 130A completes a mobile transaction and at the end of mobile transaction redirects the user on client machine 102A to another application (e.g., an application from merchant 190) running on client machine 102A to allow the merchant 190 to present the user with a receipt, survey, coupon, or other experience using the other application.

At block 314, mobile payment system 130 provides the enhanced merchant experience to the user sometime after the mobile transaction has been completed. In an example, mobile payment system 130A provides the enhanced merchant experience after completion of the mobile transaction, using an email message, push notification, application message, generated direct mailing, etc.

Figure 4:
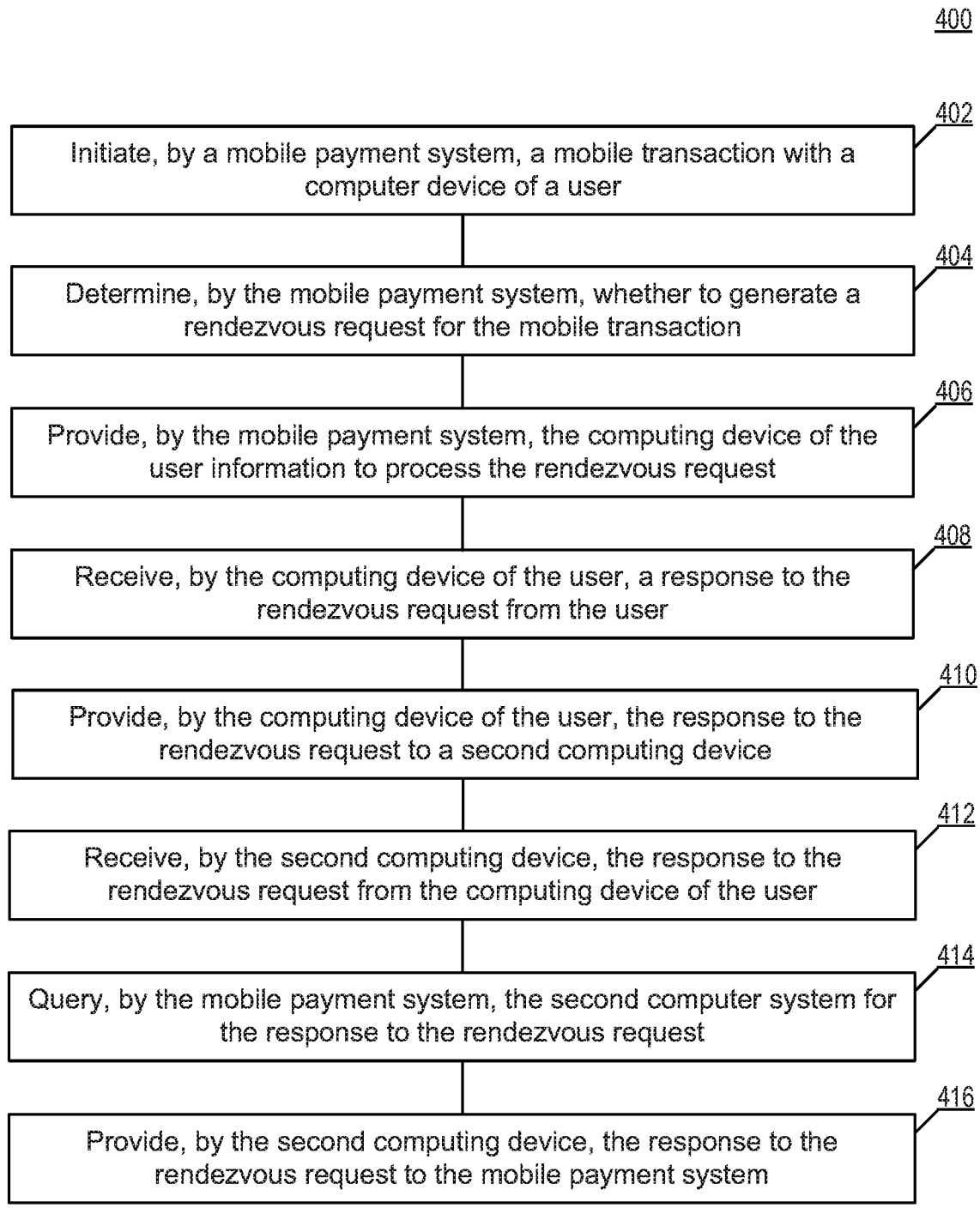
FIG. 4 is a flow diagram for providing a NFC rendezvous protocol for enhanced mobile transactions, according to an example of the present disclosure.

FIG. 4 is a flow diagram for providing a NFC rendezvous protocol for enhanced mobile transactions, according to an example of the present disclosure. The method 400 may be performed by processing logic that may comprise hardware (circuitry, dedicated logic, programmable logic, microcode, etc.), software (such as instructions run on a general purpose computer system, dedicated machine, or processing device), firmware, or a combination thereof. Examples in the method 400 are described generally from a perspective of mobile payment system 130M for consistency, and also generally apply to other mobile payment system 130, 130A, 130N examples described herein.

Method 400 begins at block 402 when mobile payment system 130M initiates a mobile transaction with a computing device of a user. In an example, mobile payment system 130M of a near field communication (NFC) terminal 192 initiates a mobile transaction with a client machine 102A placed near the terminal 192 by a user. For example, a user may check in (e.g., at a doctor's office, mechanic, nail salon, barber, etc.) or complete a purchase using terminal 192.

At block 404, mobile payment system 130M determines whether to generate a rendezvous request for the mobile transaction. In an example, mobile payment system 130M determines whether to trigger a rendezvous request. A rendezvous request generally describes a special type of request that allows a user to complete a long-running, multi-step, and/or multi-location activity using a single interaction with a near field communication (NFC) terminal 192.

For example, a visit to the doctor's office may require that a user to fill out one or more lengthy forms. In addition, various types of mobile transactions may require several steps to gather additional information or special approvals. Such multi-step transactions generally require multiple, different interactions with the same NFC terminal 192 (e.g., two, three, four or more taps, etc.). In general, duration of a single NFC terminal transaction may be limited to under one second (e.g., milliseconds), which is usually not suitable for supporting multi-step or lengthy transactions. However, a rendezvous request allows a merchant 190 to request a special type of NFC transaction that can be completed off-line by a user with a single NFC terminal 192 interaction.

In an example, mobile payment system 130M determines to generate a rendezvous request for a mobile transaction when the transaction is likely or expected to take longer than a NFC terminal transaction timeout, the mobile transaction is expected to take the user two or more steps, or user is to provide information that is unavailable at the time of mobile transaction. Mobile payment system 130M also may determine to generate a rendezvous request for a mobile transaction based on one or more other reasons, such as a busy location, a user preference, merchant 190 preference, etc.

In an example, mobile payment system 130M of terminal 192 provides information about the generated rendezvous request to mobile payment system 130 of server machine 110, thus allowing mobile payment system 130 to prepare for and receive a corresponding user response. For example, mobile payment system 130M may provide mobile payment system 130 running on a server machine 110 with a unique identifier or GUID (random, sequential, etc.) used to identify the rendezvous request and also other information describing the rendezvous request. Such information, for example, may guide server machine 110 in receiving and processing a response to the rendezvous request from client machine 102A at a future time.

At block 406, mobile payment system 130M provides the computing device of the user with information to process the rendezvous request. In an example, mobile payment system 130M of a near field communication (NFC) terminal 192 provides client machine 102A a unique identifier (ID) or GUID identifying a rendezvous request. In addition, mobile payment system 130M also generally provides additional information and/or instructions to indicate what client machine 102A should do to process the rendezvous request. For example, payment system 130M may provide specific instructions to the user, such as to complete a form, to approve a transaction amount, etc. Further, payment system 130M also may provide one or more documents, forms, webpages, links or other information that a user may use to complete the rendezvous request.

At block 408, the computing device of the user receives a user's response to the rendezvous request. In an example, client machine 102A provides rendezvous request instructions and/or other information to a user for completion. Client machine 102A then receives the user's response to the rendezvous request, which then may be provided back to merchant 190 for further processing.

At block 410, the computing device of the user provides the user's rendezvous request response to server machine 110. In an example, client machine 102A provides the user's response to the rendezvous request and the unique identifier (ID) of the rendezvous request to the mobile payment system 130 running on server machine 110.

At block 412, server machine 110 receives the user's response to the rendezvous request from the computing device of the user. In an example, mobile payment system 130 receives the user's response to the rendezvous request and the unique identifier (ID) identifying the request. Mobile payment system 130 then processes the response to the rendezvous request. For example, payment system 130 may send the response to the rendezvous request to merchant 190, insert the response to the rendezvous request to merchant's 190 processing queue, store the response to the rendezvous request for later processing by the merchant 190, etc.

At block 414, mobile payment system 130M queries server machine 110 for the response to the rendezvous request. In an example, mobile payment system 130M periodically polls server machine 110 for the response to the rendezvous request. Mobile payment system 130M also may directly request the response to the rendezvous based on single a merchant 190 query (without continuous or periodic polling.

At block 416, server 110 provides the response to the rendezvous request to mobile payment system 130M. In an example, mobile payment system 130M receives the response the rendezvous request from server 110 and continues and or finishes processing the mobile transaction previously initiated at the near field communication (NFC) terminal 192 of the merchant 190. For example, merchant 190 may complete a multi-step or long-running NFC transaction with a user at terminal 192 after receiving the user's response to a rendezvous request previously initiated between the merchant 190 and the user.

Figure 5:
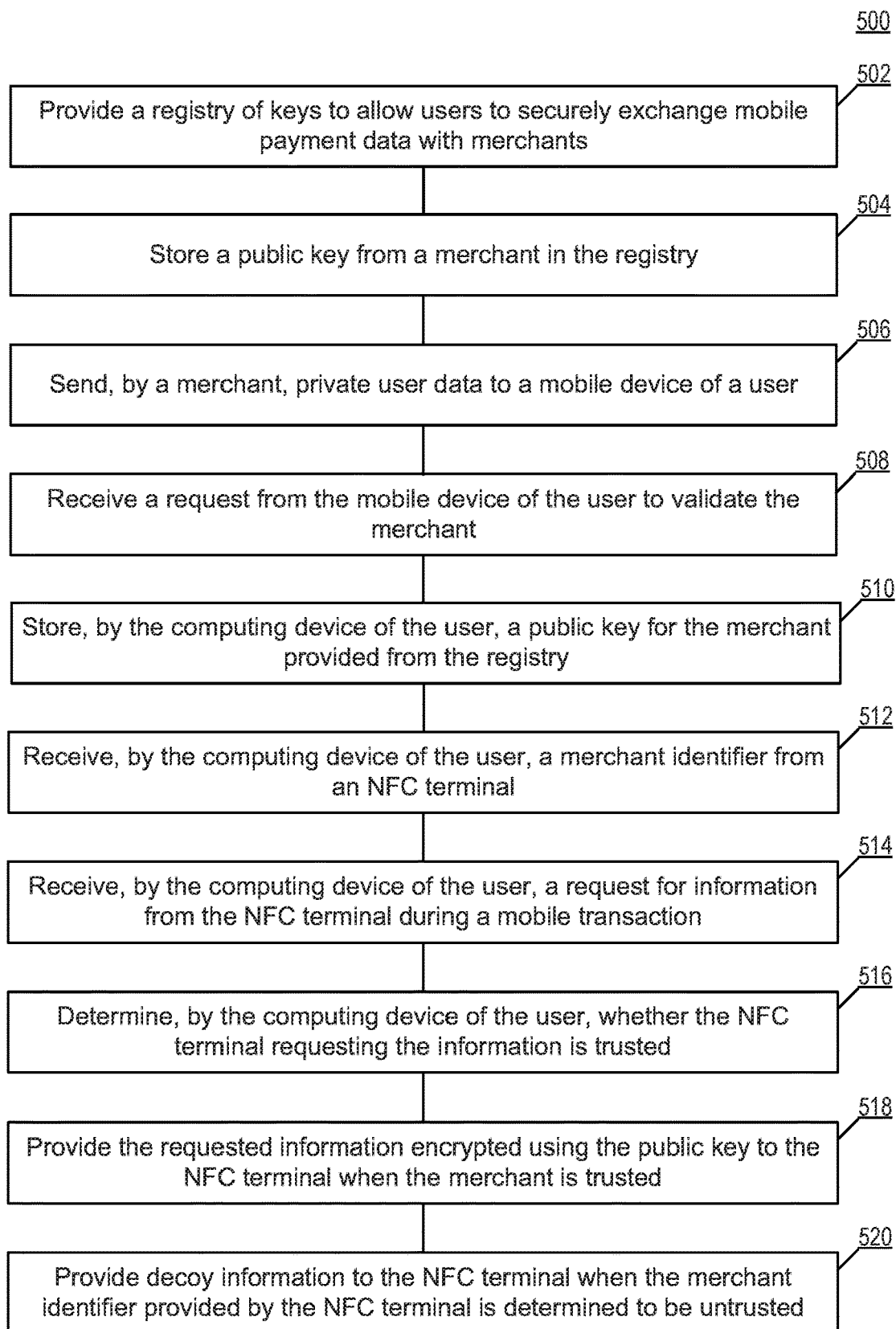
FIG. 5 is a flow diagram for providing mobile application registry services for enhanced mobile transactions, according to an example of the present disclosure.

FIG. 5 is a flow diagram for providing mobile application registry services for enhanced mobile transactions, according to an example of the present disclosure. The method 500 may be performed by processing logic that may comprise hardware (circuitry, dedicated logic, programmable logic, microcode, etc.), software (such as instructions run on a general purpose computer system, dedicated machine, or processing device), firmware, or a combination thereof.

Method 500 begins at block 502 when a payment processor provides a registry of keys to allow users to securely exchange mobile payment data with respective merchants 190. In an example, mobile payment system 130 of a payment service provider or another third-party provides a registry of public keys that allow smart devices to securely communicate with near field communication (NFC) terminals 192 of merchants 190. For example, payment system 130 may store merchant 190 information, public keys for one or more merchants 190, and other data related to parties involved in mobile transactions in data store 180. Mobile payment system 130 then may provide the public key for merchant 190 to users and perform merchant 190 validation for users seeking to perform mobile transactions.

At block 504, merchant 190, payment processing provider, or another party stores a public key from the merchant 190 in the registry. In an example, mobile payment system 130 receives the public key from merchant 190 or from another party on behalf of merchant 190. In general, the public key may be distributed to users seeking to participate in secure mobile transactions with merchant 190. For example, users may encrypt data using the public key of merchant 190, then merchant 190 or another party with access to a corresponding private key may use the private key to unencrypt such data. In one example, payment system 130 stores a public key from merchant 190 in a registry on data store 180.

At block 506, merchant 190 sends private user data to a mobile device of the user. In an example, the mobile payment system 130M running on terminal 192 sends private user data to the mobile payment system 130A running on client machine 102A. For example, merchant 190 may send data to the user for later storage and retrieval.

In an example, terminal 192 sends client machine 102A a merchant identifier (ID) and data (e.g., a number, an alphanumeric string, a binary large object, or any other type(s) of data) to be stored on client machine 102A. Terminal 192 also may provide one or more parameters describing how data is to be stored. For example, terminal 192 may send client machine 102A loyalty card information, transactional information, or other types of information that a user may reference for use in the future. Terminal 192 also may define one or more parameters for the data, such as privacy parameters, validity or expiration parameters, or other criteria about how the data is to be stored and/or used. In one example, terminal 192 creates and sends client machine 102A a new loyalty card for the user and indicates that the loyalty card may be used by other family members or computing devices associated with the user. Further, terminal 192 may indicate that the loyalty card is valid for a period of one or more days, weeks, months, years, etc.

At block 508, the payment processor receives a request to validate merchant 190 from the mobile device of the user. In an example, terminal 192 provides client machine 102A with a merchant identifier (ID) and client machine 102A requests a public key for the merchant 190 from a public key registry using the merchant identifier (ID). Client machine 102A also may request that payment system 130 validate the merchant 190 using the merchant identifier (ID), for example, to confirm that the merchant 190 is known, trusted, and/or meets one or more predetermined criteria (e.g., ratings, certifications, etc.). Client machine 102A then receives the public key for merchant 190 from mobile payment system 130 when the merchant is located and indicated to be trusted, which client machine 102A then may be used to encrypt data communicated to merchant 190 and/or terminal 192.

At block 510, the computing device of the user stores the public key for the merchant 190 provided from the registry. In an example, client machine 102A receives a public key for merchant 190 from mobile payment system 130. Client machine 102A then stores the public key locally or in data store 180. Further, client machine 102A then may use the public key to encrypt and securely communicate data to merchant 190 and/or terminals 192 associated with merchant 190.

At block 512, the computing device of the user receives a merchant identifier from a NFC terminal 192. In an example, client machine 102A interacts or begins a new transaction with terminal 192. Terminal 192 provides client machine 102A with a merchant identifier (ID) indicating a merchant 190 associated with terminal 192. Further, terminal 192 also may request one or more pieces of information (e.g., account number, customer ID, loyalty card, coupon, promotion, discount, etc.) from client machine 102A to process or complete the transaction.

In an example, client machine 102A receives a merchant identifier (ID) from terminal 192 and sends a request to mobile payment system 130 to validate merchant 190. Payment system 130 then may perform one more validation checks based on the provided merchant identifier (ID), terminal 192 information, terminal 192 location, known merchant locations, etc. Client machine 102A also may perform a local search to determine whether the merchant identifier (ID) provided by terminal 192 is known or trusted and whether client machine 102A has access to a public key associated with the merchant identifier (ID).

At block 514, the computing device of the user receives a request for information from the NFC terminal 192 during a mobile transaction. In an example, terminal 192 requests one or more pieces of data from client machine 102A. For example, terminal 192 may request an account number, customer ID, loyalty card, coupon, promotion, discount, and/or other information associated with the user, the mobile transaction, payment information, or something else from client machine 102A.

At block 516, the computing device of the user determines whether the NFC terminal requesting the information is trusted. In an example, client machine 102A determines whether terminal 192 is trusted based on a response to a validation request from mobile payment system 130 pertaining to a merchant identifier (ID) provided by terminal 192. Client machine 102A also may determine whether terminal 192 is trusted based on whether the merchant identifier (ID) is known or familiar to client machine 102A. For example, client machine 102A may determine that terminal 192 is trusted based on previous transactions completed with terminal 192 and/or previous transactions completed with merchant 190 based on the merchant identifier (ID) presented by terminal 192.

At block 518, the computing device of the user provides the requested information encrypted using the public key to the NFC terminal when the merchant is trusted. In an example, a client machine 102A determines that terminal 192 is trusted. Client machine 102A then retrieves the information requested by terminal 192 and encrypts the requested information using the public key received for the associated merchant 190. Client machine 102A then provides the encrypted information to terminal 192, for example, to complete a mobile payment transaction or payment.

In an example, the information may be encrypted using a salt or such random data so that common information (e.g., the same loyalty card number, client account, or other information) appears different in each communication. Further, such encrypted data may be provided to terminal 192 in various ways, such as in segments, as a stream, or using one or more various data types (e.g., numbers, strings, binary large objects, etc.).

At block 520, the computing device of the user provides decoy information to the NFC terminal when the merchant identifier provided by the NFC terminal 192 or the NFC terminal 192 is determined to be untrusted. In an example, client machine 102A determines that terminal 192 is untrusted. For example, client machine 102A may receive indication from mobile payment system 130 that terminal 192 or a merchant identifier provided by terminal 192 is untrusted. Client machine 102A also may determine that terminal 192 is untrusted when a merchant identifier (ID) provided by terminal 192 is unknown, when client machine 102A has no previous record of transactions with merchant identifier (ID), or client machine 102A is unable to locate a public key associated with the merchant identifier (ID).

In an example, client machine 102A prepares decoy information to provide to a non-trusted terminal 192. For example, client machine 102A may generate or select pre-generated decoy information to provide to a non-trusted terminal 192 (e.g., as encrypted and/or unencrypted data). In one example, client machine 102A provides a non-trusted terminal 192 with decoy information to prevent disclosure of private data to untrusted parties, thereby preserving the privacy of merchants 190 and users. Providing such decoy information generally allows a user to complete a transaction with an untrusted merchant or terminal 192 if a user so chooses, without disclosing actual private information and without disrupting a pending mobile transaction. In some examples, client machine 102A also may decline to provide one or more pieces of requested information to a non-trusted terminal 192. Further, client machine 102A also may log information about non-trusted terminal 192, information requested by a non-trusted terminal 192, and aspects of a transaction with a non-trusted terminal 192 for future analysis.

Figure 6:
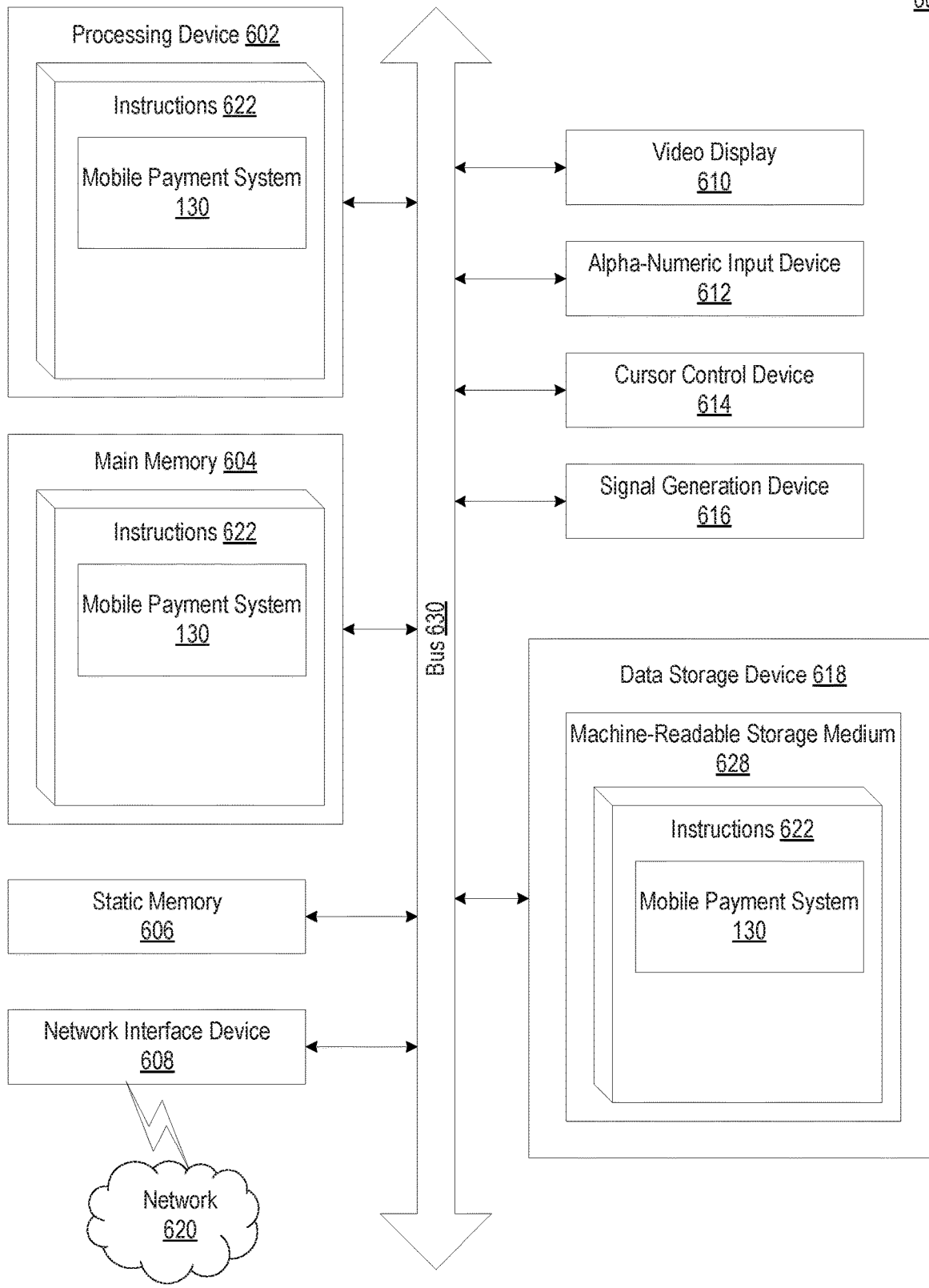
FIG. 6 is a block diagram of an exemplary computer system that may perform one or more of the operations described herein.

FIG. 6 illustrates a diagram of a machine in the exemplary form of a computer system 600, within which a set of instructions for causing the machine to perform any one or more of the examples discussed herein may be executed. In other examples, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a wearable computing device, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (processor) 602, a main memory 604 (e.g., read-only memory (ROM), flash memory, dynamic random access memory (DRAM) such as synchronous DRAM (SDRAM), double data rate (DDR SDRAM), or DRAM (RDRAM), etc.), a static memory 606 (e.g., flash memory, static random access memory (SRAM), etc.), and a data storage device 618, which communicate with each other via a bus 630.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 also may be one or more special-purpose processing devices such as an application specific integrated circuit (ASIC), a field programmable gate array (FPGA), a digital signal processor (DSP), network processor, or the like. The processor 602 is configured to execute instructions 622 for performing the operations and steps discussed herein.

The computer system 600 also may include a network interface device 608. The computer system 600 may further include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable storage medium 628 on which is stored one or more sets of instructions 622 (e.g., software computer instructions) embodying any one or more of the methodologies or functions described herein. The instructions 622 also may reside, completely or at least partially, within the main memory 604 and/or within the processor 602 during execution thereof by the computer system 600, the main memory 604 and the processor 602 also constituting computer-readable storage media. The instructions 622 may be transmitted or received over a network 620 via the network interface device 608.

In one example, the instructions 622 include instructions for one or more modules of a mobile payment system (e.g., mobile payment system 130 of FIG. 1) and/or a software library containing methods that call a mobile payment system. While the computer-readable storage medium 628 (machine-readable storage medium) is shown as an example to be a single medium, the term "computer-readable storage medium" should be taken to include a single medium or multiple media (e.g., a centralized or distributed database, and/or associated caches and servers) that store the one or more sets of instructions. The term "computer-readable storage medium" also may include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Numerous details are set forth in the foregoing description. However, it will be apparent to one of ordinary skill in the art having the benefit of this disclosure that the present disclosure may be practiced without these specific details. In some instances, well-known structures and devices are shown in block diagram form, rather than in detail, to avoid obscuring the present disclosure.

Some portions of the detailed description have been presented in terms of algorithms and symbolic representations of operations on data bits within a computer memory. Here, an algorithm is generally conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "computing", "comparing", "associating", "applying", "transmitting", "receiving," "processing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other examples will be apparent to those of skill in the art upon reading and understanding the above description. The scope of the disclosure therefore should be determined with reference to the appended claims, along with the full scope of equivalents to which such claims are entitled.

What is claimed is:

1. A computer system, comprising:
a non-transitory memory storing instructions; and
one or more hardware processors configured to execute the instructions, which when executed by the one or more hardware processors cause the computer system to perform operations comprising:
performing a check-in with a merchant;
in response to the check-in, receiving, from a payment device of the merchant, a rendezvous request comprising a merchant identifier of the merchant and instructions for a processing step required to be completed by the computer system prior to establishing a near field communication (NFC) connection with the payment device of the merchant to process a mobile transaction with the merchant;
transmitting, to a third-party server over a network, a request to validate the merchant during the mobile transaction;
based on the request, receiving a public encryption key of the merchant from the third-party server;
populating a request for purchaser information from the payment device of the merchant as part of the mobile transaction;
receiving a response to the request comprising a validation of the payment device of the merchant by the third-party server;
encrypting the purchaser information using the public encryption key;
establishing the NFC connection with the payment device of the merchant;
providing the encrypted purchaser information to the payment device of the merchant through the NFC connection for a processing of the mobile transaction by the payment device of the merchant; and
receiving a confirmation of the processing of the mobile transaction by the payment device of the merchant.

2. The computer system of claim 1, wherein the merchant identifier indicates that the payment device of the merchant is associated with the merchant.

3. The computer system of claim 1, wherein the validation of the payment device of the merchant is also based on a previous transaction with the payment device of the merchant.

4. The computer system of claim 1, wherein the receiving the public encryption key of the merchant comprises:
receiving the public encryption key of the merchant from a registry of public keys associated with the third-party server.

5. The computer system of claim 1, wherein the encrypting the purchaser information is performed in response to the validation of the payment device of the merchant by the third-party server.

6. The computer system of claim 1, wherein the operations further providing the purchaser information encrypted by the public encryption key of the merchant comprise:
encrypting loyalty card information in response to the validation of the payment device of the merchant; and
transmitting the encrypted loyalty card information to the payment device of the merchant for the processing the mobile transaction.

7. A non-transitory machine-readable medium having stored thereon machine-readable instructions, when executed by a processor, cause the processor to perform operations comprising:
  performing a check-in with a merchant;
  in response to the check-in, receiving, from a payment device of the merchant, a rendezvous request comprising a merchant identifier of the merchant and instructions for a processing step required to be completed prior to establishing a near field communication (NFC) connection separate from the communication with the payment device of the merchant to process a mobile transaction with the merchant;
  transmitting to a third-party server over a network, a request to validate the merchant during the mobile transaction;
  based on the request, receiving a public encryption key of the merchant from the third-party server;
  populating a request for purchaser information from the payment device of the merchant as part of the mobile transaction;
  receiving a response to the request comprising a validation of the payment device of the merchant by the third-party server;
  encrypting the purchaser information using the public encryption key;
  establishing the NFC connection with the payment device of the merchant;
  providing the encrypted purchaser information to the payment device of the merchant through the NFC connection for processing the mobile transaction by the payment device of the merchant; and
  receiving a confirmation of the processing of the mobile transaction by the payment device of the merchant.

8. The non-transitory machine-readable medium of claim 7, wherein the merchant identifier indicates that the payment device of the merchant is associated with the merchant.

9. The non-transitory machine-readable medium of claim 7, wherein the validation of the payment device of the merchant is also based on a previous transaction with the payment device of the merchant.

10. The non-transitory machine-readable medium of claim 7, wherein the operations further comprise:
  receiving the public encryption key of the merchant from a registry of public keys associated with the third-party server.

11. The non-transitory machine-readable medium of claim 7, wherein the encrypting the purchaser information is performed in response to the validation of the payment device of the merchant by the third-party server.

12. The non-transitory machine-readable medium of claim 7, wherein the operations further comprise:
  encrypting loyalty card information in response to the validation of the payment device of the merchant; and
  transmitting the encrypted loyalty card information to the payment device of the merchant for the processing the mobile transaction.

13. A computer-implemented method, comprising:
  performing a check-in with a merchant;
  in response to the check-in, receiving, from a payment device of the merchant, a rendezvous request comprising a merchant identifier of the merchant and instructions for a processing step required to be completed by a purchaser device prior to establishing a near field communication (NFC) connection separate from the communication with the payment device of the merchant to process a mobile transaction with the merchant;
  transmitting, to a third-party server over a network by the purchaser device, a request to validate the merchant during the mobile transaction;
  based on the request, receiving, by the purchaser device, a public encryption key of the merchant from the third-party server;
  populating, by the purchaser device, a request for purchaser information from the payment device of the merchant as part of the mobile transaction;
  receiving a response to the request comprising a validation of the payment device of the merchant by the third-party server;
  encrypting the purchaser information using the public encryption key;
  establishing the NFC connection with the payment device of the merchant;
  providing the encrypted purchaser information to the payment device of the merchant through the NFC connection for processing the mobile transaction by the payment device of the merchant; and
  receiving a confirmation of the processing of the mobile transaction by the payment device of the merchant.

14. The computer-implemented method of claim 13, wherein the merchant identifier indicates that the payment device of the merchant is associated with the merchant.

15. The computer-implemented method of claim 13, wherein the validation of the payment device of the merchant is also based on a previous transaction with the payment device of the merchant.

16. The computer-implemented method of claim 13, wherein receiving the public encryption key of the merchant comprises:
  receiving the public encryption key of the merchant from a registry of public keys associated with the third-party server.

17. The computer-implemented method of claim 13, wherein the encrypting the purchaser information is performed in response to the validation of the payment device of the merchant by the third-party server.

18. The computer-implemented method of claim 13, wherein the method further comprises:
  encrypting loyalty card information in response to the validation of the payment device of the merchant; and
  transmitting the encrypted loyalty card information to the payment device of the merchant for the processing the mobile transaction.

19. The computer system of claim 1, wherein the check-in is performed wirelessly with the payment device of the merchant.

20. The computer-implemented method of claim 13, wherein the check-in is performed wirelessly with the payment device of the merchant.

* * * * *

UNITED STATES PATENT AND TRADEMARK OFFICE
CERTIFICATE OF CORRECTION

PATENT NO. : 11,049,090 B2  
APPLICATION NO. : 14/984968  
DATED : June 29, 2021  
INVENTOR(S) : Max Edward Metral Page 1 of 1

It is certified that error appears in the above-identified patent and that said Letters Patent is hereby corrected as shown below:

In the Claims

In Column 18, Lines 61-62, delete "providing the purchaser information encrypted by the public encryption key of the merchant".

Signed and Sealed this  
Twenty-fifth Day of January, 2022

Drew Hirshfeld  
*Performing the Functions and Duties of the*  
*Under Secretary of Commerce for Intellectual Property and*  
*Director of the United States Patent and Trademark Office*